SIGNAL NORMALIZATION APPARATUS FOR PIPELINE LOGGING

Filed Nov. 3, 1967 3 Sheets-Sheet 1

NOEL B. PROCTOR &
R. C. BEAVER
INVENTORS

BY Arnold, Roylance,
Kruger & Durkee
ATTORNEYS

SIGNAL NORMALIZATION APPARATUS FOR PIPELINE LOGGING

Filed Nov. 3, 1967 3 Sheets-Sheet 2

NOEL B. PROCTOR &
R. C. BEAVER
INVENTORS

BY Arnold, Roylance,
Kruger & Durkee
ATTORNEYS

NOEL B. PROCTOR &
R. C. BEAVER
INVENTORS
BY Arnold, Roylance,
Kruger & Durkee
ATTORNEYS United States Patent Office 3,496,457
Patented Feb. 17, 1970

1 2

3,496,457
SIGNAL NORMALIZATION APPARATUS FOR PIPELINE LOGGING

Noel B. Proctor and Ruby C. Beaver, Houston, Tex., assignors to American Machine & Foundry Co., New York, N.Y., a corporation of New Jersey Filed Nov. 3, 1967, Ser. No. 680,553
Int. Cl. G01r 33/12
U.S. Cl. 324—37 10 Claims

ABSTRACT OF THE DISCLOSURE

This application discloses pipeline inspection apparatus propelled through the pipeline by the fluid product being transported, the conditions of the pipeline wall being detected by search coils responsive to flux leakage. Signals produced by the search coils are recorded, and upon playback for conversion to a visual log the playback speed is varied inversely with the speed of the inspection apparatus through the pipeline whereby the signal amplitude is normalized with respect to speed. A speed reference signal may be recorded along with the flaw signals to provide the basis for playback speed control.

Natural gas and liquid petroleum products are transported from producing and refining areas to population centers throughout the country by a grid of large pipelines extending for many thousands of miles. These pipelines often pass through heavily populated areas, and due to the high pressures sometimes used, and the volatile nature of the products, the pipelines are considered a hazard to persons and property if not maintained in perfect condition. Pits and cracks resulting from corrosion, manufacturing defects, root growth, and various other factors may weaken the pipelines so that leaks develop or ruptures occur, especially in lines which have been in place for many years. Since cracks often occur in a longitudinal direction, normal to the principal stress, large sections of the line have been known to rupture catastrophically. For these reasons pipelines are periodically surveyed to defect flaws or defects which may later result in leaks or rupture.

Inspection of pipeline which is buried below ground is usually performed by so-called inspection "pigs" which traverse long lengths of the line under propulsion of the liquid product while scanning the interior walls of the line for defects. A variety of flaw detecting devices have been employed in these inspection pigs, but one of the most effective has been found to be flux leakage detection. Magnetic flux is produced in the steel pipeline walls, and flux leakage or perturbations as may be caused by flaws in the metal are detected, signals produced by the flux sensors being recorded as the pig travels through the line. While Hall effect devices and magnetometers may be used for flux leakage detectors, still the simplest and most reliable detector is a search coil which generates signals in response to the rate of change of flux linking the coil. In most of the flux sensors suitable for use in pipeline inspection pigs, the flaw signals produced will be related in magnitude to the speed of the pig as it moves through the pipeline.

The speed of a pipeline inspection pig traveling through a line will vary quite widely, especially when the product being transported is natural gas which is compressible. Usually the pipeline contains many bends and twists which the pig must negotiate, and also obstructions will be encountered in the form of "icicles" of weld material, debris left in the line upon construction, discontinuities at valve seats, changes in the diameter of the line, etc. While the outside diameter of the pipeline is usually maintained constant, the pipewall thickness will vary because greater wall thickness is used in heavily populated areas and at locations where the pipe goes under highways, streets, railroads or buildings. The friction exhibited by the pipeline retarding movement of the inspection pig will thus vary greatly. When the pig encounters a section of thick-walled pipe, it will slow down drastically, at least until pressure has built up by compression of gas behind the pig. Accordingly, the velocity of the inspection pig may vary quite widely, perhaps from two or three miles per hour up to fifteen miles per hour, even though the pumping rate is constant. In addition, the pumping rate may vary from time to time, resulting in further speed variations.

Since the speed of the inspection pig through the pipeline varies widely, and the magnitude of the flaw signals produced is dependent upon speed according to a logarithmic relationship, the reliability of the log obtained from an inspection run will not be high in regard to correlation of the size of the flaw indications on the log with the actual size of the flaws existing in the pipewall. A defect of a given size in the wall will produce a large amplitude signal when the pig velocity is high, while the same flaw would produce a small signal for low pig speed. Error will be introduced into the evaluation of the severity of flaws or defects, especially for logs of gas transmission lines where the pig velocity is very nonuniform.

A principal feature of this invention, therefore, is the compensation for the variation in magnitude of flaw signals which results from changes in the speed of movement of pipeline inspection apparatus used for flaw detection. Another feature is the provision of recording techniques for pipeline inspection pigs wherein the logs produced for visual inspection will be normalized with respect to pig speed.

In accordance with one preferred form of the invention, pipeline inspection apparatus is provided which contains a multiple channel tape recorder for recording signals from search coils scanning the pipeline walls and also for recording a speed reference signal. The speed reference may be generated from a wheel engaging the pipeline wall, thus rotating at a rate dependent upon pig speed. In the playback apparatus used to convert the signals on the magnetic tape to a visual strip chart type log, the tape speed is varied in an inverse manner with reference to the pig speed as indicated by the speed reference signal. Since the playback head will produce signals related in magnitude to playback tape speed, and this relationship is the same as that between the search coils and the pipeline wall, the visual record will thus be normalized as to speed. A given sized flaw will produce a pulse on the log which is of the same size regardless of the speed of movement of the pig.

The novel features believed characteristic of the invention are set forth in the appended claims. The invention itself, however, as well as further features and advantages thereof, may best be understood by reference to the following detailed description of particular embodiments, when read in conjunction with the accompanying drawings, wherein:

Figure 1:
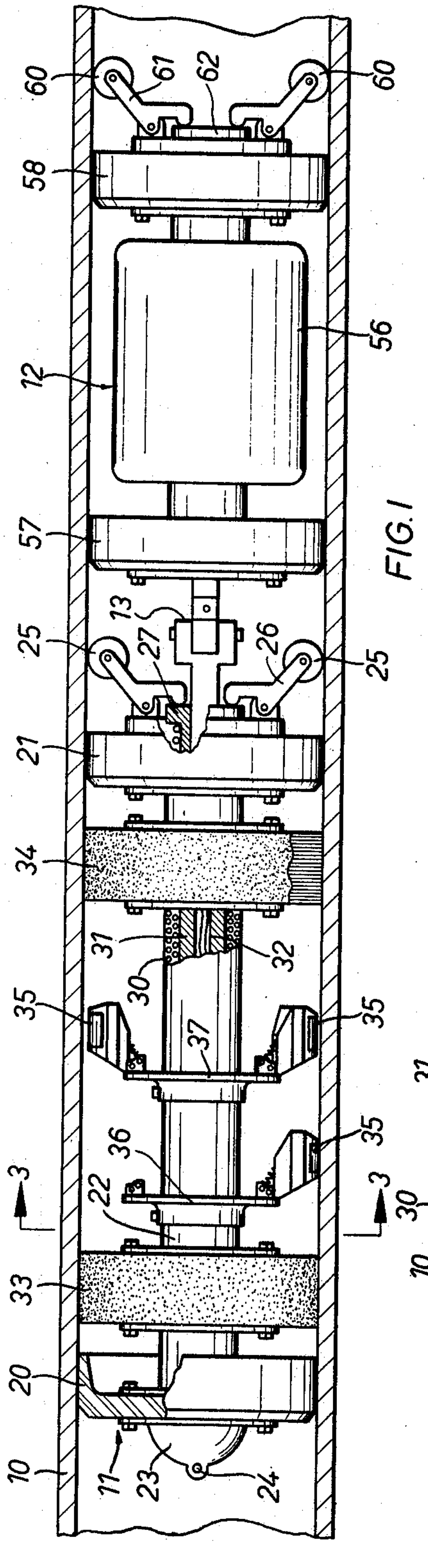
FIGURE 1 is an elevation view, partly in section and partly broken away, of pipeline inspection apparatus in which the flaw signal normalization technique of the invention may be utilized.
Figure 6:
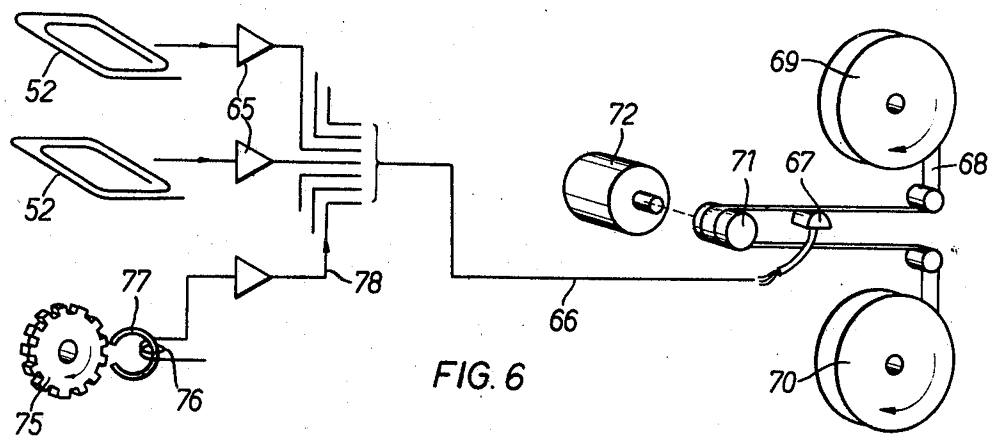
FIGURE 6 is a schematic illustration of a tape recording arrangement used in the apparatus of FIGURE 1 according to the invention.
Figure 8:
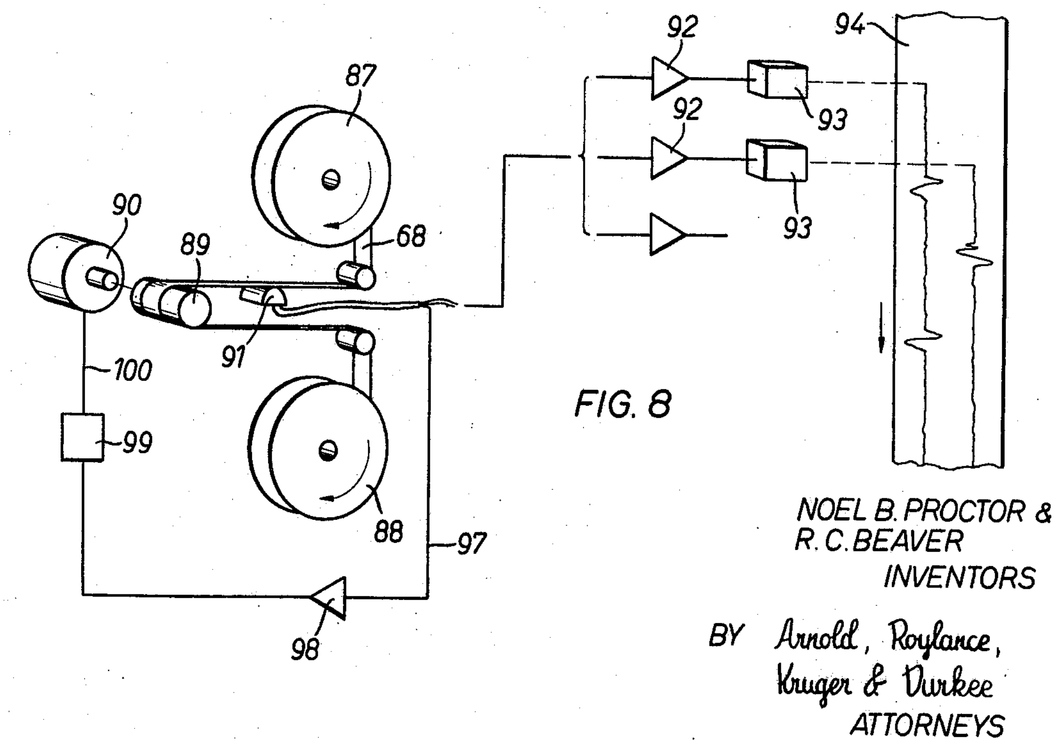
FIGURE 8 is a schematic illustration of a tape playback system according to the invention.
Figure 10:
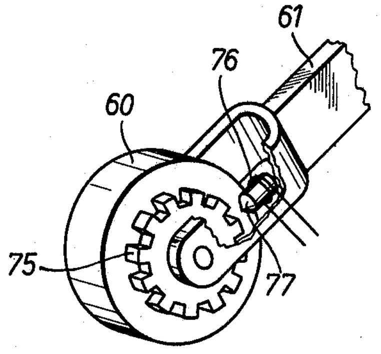

FIGURES *9a–9d* are graphic illustrations of speed or amplitude versus time for various portions of the systems of FIGURES 6 and 8;

FIGURE 10 is an enlarged detail view of one of the wheels in the apparatus of FIGURE 1 incorporating the speed signal generator.

In the various views of the drawings, which form a part of this specification and are incorporated herein, like parts appearing in several views bear like reference numerals.

With reference to FIGURE 1 of the drawings, pipeline inspection or logging apparatus of the type utilizing the magnetic tape velocity compensation technique according to the invention is illustrated. This type of inspection apparatus, usually referred to as an inspection "pig," is a self-contained unit which is propelled through a pipeline 10 by the gas or liquid product being transported in the pipeline. The inspection pig functions to scan the interior walls of the pipeline for flaws, pits and other defective conditions, and to record this information for subsequent study which may result in a decision to repair or replace sections of the line. The inspection pig is inserted into a line at a pumping station by the use of a trap of the type commonly used to insert scrapers, and since the pumping stations are ordinarily perhaps fifty miles apart, the pig must be able to navigate this distance without replenishing batteries or magnetic tape reels, or other types of sustaining maintenance. At speeds of five to ten miles per hour, which is the speed of movement of the product in the line, it is seen that the inspection pig will be self-sustaining for several hours. While traversing these distances, the pig must negotiate turns and discontinuities in the lines, as may occur where the line is routed around obstructions, and so the inspection assembly is constructed in several sections which are connected together by universal joints so that a fairly tight turning radius is permitted. The pig will encounter variations in pipeline diameter as well as obstructions such as valve seats, debris, icicles of weld material, dents in the pipewall, and the like. The existence of obstructions of this type require that the outer periphery of the pigging apparatus be somewhat flexible or yieldable, and also require that the pig be quite rugged. These factors compel construction of the pipeline inspection pig in the manner indicated.

Figure 2:
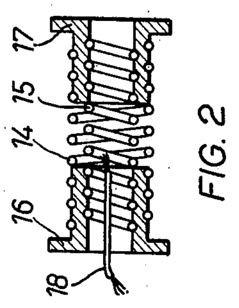
FIGURE 2 is an elevation view in section of an alternative embodiment for a coupling device for use in the apparatus of FIGURE 1.

The pipeline inspection pig of FIGURE 1 includes two separate sections, although other sections can be used as needed. The first section 11 functions as the drive or propulsion section and also carries the magnetizer and detector arrangement. The trailing section 12 contains the power supply which may be a bank of batteries or fuel cells, along with the electronic instrumentation as well as the magnetic recorder which will be described in detail. The drive section 11 and the instrumentation section 12 are coupled together by a ball joint or universal joint 13, with the electrical cables connecting the detectors with the instrumentation bridging the coupling. A preferred type of coupling arrangement between the sections of the inspection pig is a pair of oppositely wound spring members as illustrated in FIGURE 2. Here a larger spring 14 and a smaller spring 15 coaxial with one another fit in outer and inner grooves in cylindrical members 16 and 17 secured respectively to the back of the section 11 and the front of the section 12. An electrical cable 18 may be threaded through the coupling of FIGURE 2 with no danger of being severed as might occur in a ball or universal joint. The electrical cable would also be threaded through a central bore in the sections 11 and 12.

The drive and detector section 11 for the inspection pig of FIGURE 1 includes a pair of rubber cups or packers 20 and 21 which function to trap fluid on the right-hand side and thus propel the assembly from right to left due to the pressure differential which will exist across the cups. The lips of the cups 20 and 21 will be urged outwardly by fluid pressure and so will provide a seal to trap fluid even though the diameter of the pipeline varies over a considerable range. The drive cups 20 and 21 are mounted on a central cylindrical housing 22, and the front end of the housing is shaped to provide a dome-like nose piece 23, a lifting eye 24 being used for handling the heavy apparatus. A centralizer assembly may be provided at the rear of the drive and detector section 11 and would ordinarily comprise several wheels 25 mounted on pivoted arms 26 which are spring-biased outwardly by a central drum 27. Usually three of the wheel and arm assemblies would be used, spaced at 120° positions. The purpose of the centralizer is to prevent settling of the inspection pig toward the bottom of the pipeline under its own weight.

Figure 3:
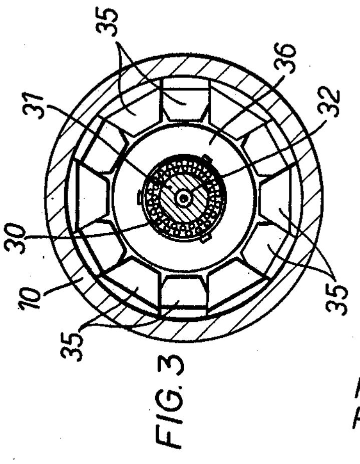
FIGURE 3 is a cross-sectional view of the apparatus of FIGURE 1, taken along the line 3—3 in FIGURE 1.

The flaw detection technique employed in the inspection pig of FIGURE 1 is based on producing magnetic flux in the pipeline walls and detecting flux leakage adjacent the interior surface of the wall as may be caused by defects in the wall. The magnetic flux is provided by a winding 30 on a central cylindrical iron core 31, the winding being excited by direct current supplied from the power pack in the section 12. Electrical cables for supplying power to the winding 30 and for connections to the detectors are threaded through a central bore 32. Pole pieces for coupling magnetic flux from the ends of the core 31 to the pipewall are in the form of large cylindrical steel wire brushes 33 and 34. A closed loop of the magnetic circuit thus includes the length of the core 31, the brush 33, the pipewall 10, the brush 34, and back to the core 31. Magnetic flux parallel to the axis of the pipeline is thus provided which is evenly distributed around the circumference of the pipeline 10. Most of the magnetic flux will pass through the steel pipewall, but in the vicinity of defects or flaws flux will be displaced out of the wall and may be detected adjacent the interior surface. For this purpose, a plurality of detector shoe assemblies 35 are positioned between the brushes 33 and 34 in an array which is effective to scan the entire circumference of the line. Each of the detector shoe assemblies 35 scans about 30° of arc and so there are twelve such shoes, six of the shoes being mounted on one disk-shaped mounting plate 36 while six more are mounted on a second mounting plate 37. The shoe assemblies 35 on the plate 36 are displaced from one another by 60°, as are the shoe assemblies on the plate 37, with the assemblies 35 on the plate 37 being of course displaced by 30° with respect to those on the plate 36 so that the entire circumference will be scanned as seen by the cross-sectional view of FIGURE 3.

Figures 4, 5:
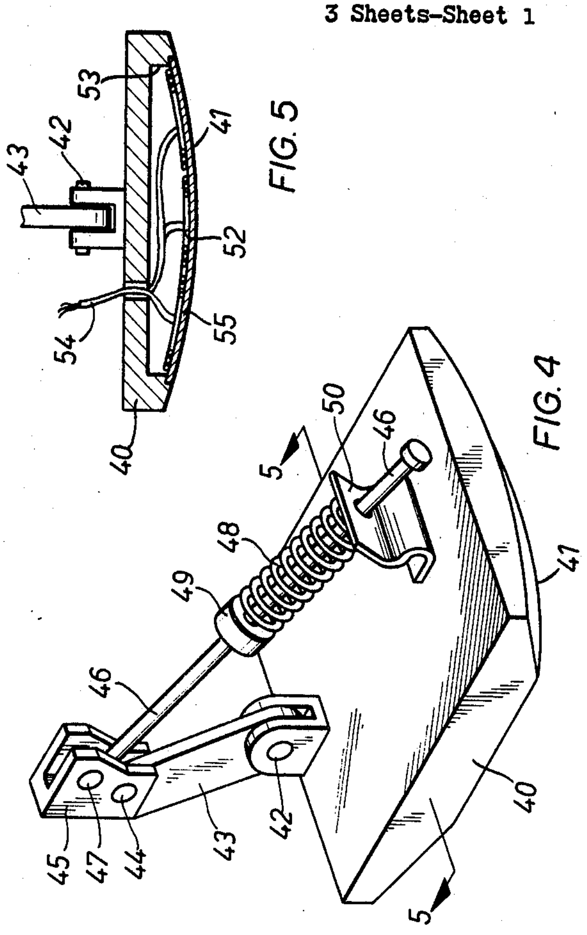
FIGURE 4 is an enlarged pictorial view of one of the detector shoe assemblies used in the apparatus of FIGURE 1, partly broken away.
FIGURE 5 is a detail view in section of the detector shoe of FIGURE 4, taken along the line 5—5 in FIGURE 4.

An enlarged detail view of one of the detector shoe assemblies 35 is seen in FIGURE 4. The assembly includes a shoe 40 defining a curved outer face 41 which bears against the pipewall surface. The shoe 40 is mounted at a pivot 42 to a member 43 that is secured at a pivot 44 to a mounting bracket 45 on the mounting plate 36. A rod 46 connected to the bracket 45 at a pivot 47 bears a spring 48 which biases the rear of the assembly outward since the spring is compressed between a member 49 and a bracket 50. In this manner the shoe 40 will be urged firmly outward against the pipewall regardless of the pipeline diameter while the shoe may be deflected by and ride over various types of obstructions which would be encountered. The shoe assemblies are ruggedly constructed of heavy metal parts to withstand the repeated collisions with icicles of weld metal, valve seats, debris, etc., it being noted that the detector shoes will bounce and chatter quite violently as the inspection pig progresses downstream along the pipeline.

Leakage flux is detected in the shoe assemblies 35 by one or more detector coils 52 located within a recess 53 in the bottom face of the shoe 40 as will be seen in the sectional view of FIGURE 5. There may be only one coil 52 in each shoe, or there may be perhaps three arranged in a suitable pattern. The sensing or detector coils are merely flat coils of several turns in which signals will be generated upon the occurrence of change in the flux linking the coils as may result from flux perturbations adjacent the interior surface of the pipeline wall in the vicinity of flaws. The coils 52 are connected by a cable 54 threaded through the central bore 32 of the assembly back to the instrumentation and recording section 12. The detector coils 52 are mounted on a thin flat shim 55 composed of a nonmagnetic material such as stainless steel which functions to protect the coils but yet allow them to be positioned very closely adjacent the surface of the pipeline wall.

Flux leakage detection may be provided by other sensors rather than the search coils 52. For example, magnetic flux sensing structures using Hall effect elements may be employed as set forth in copending application Ser. No. 680,572, filed herewith and assigned to the assignee of this invention. Alternatively, flux gate magnetometers may be utilized.

The pipeline inspection apparatus of FIGURES 1–5 is of the type described and claimed in copending application Ser. No. 680,573, also filed herewith and assigned to the assignee of this invention. It is understood, however, that the particular flaw detection technique utilized is not critical to the invention but instead this type of pipeline inspection apparatus is disclosed herein as illustrative of the principle involved.

The trailing section 12 for the inspection pig contains a plurality of signal processing channels to which all of the cables 54 from the detector coils are fed. Each channel includes suitable amplifiers and signal processing circuitry and terminates in a recording head. A magnetic tape recorder which accommodates at least twelve channels for the illustrative embodiment, or perhaps a multiple of twelve plus reference channels, is contained in the trailing section within a sealed cylinder 56. The cylinder 56 would be supported by packers or rubbers 57 and 58 similar to the drive rubbers 20 and 21, but containing through ports to permit the fluid to pass through and reach the drive rubbers. The trailing section would also ordinarily use a centralizer assembly including a plurality of wheels 60 mounted on pivoted arms 61 which are spring-biased outward by a drum 62 as before. One of the wheels 60 contains a speed detector used for generating a speed reference signal for the tape recorder within the cylinder 56 in accordance with the invention, as will be described in detail below.

With reference now to FIGURE 6, the recording arrangement according to the invention will be described. It is noted that each of the search coils 52 or their equivalent is connected through a preamplifier 65 and a connection 66 to a multiple channel recording head 67 which includes provision for recording up to perhaps forty channels of information on magnetic tape 68. The tape 68 is driven from a supply reel 69 to a pickup reel 70 by means including a capstan 71. The capstan is driven by a motor 72 preferably of the synchronous type which rotates the capstan 71 at a constant speed of perhaps 1⅞" per second. All of this apparatus seen in FIGURE 6 is located within the sealed cylinder 56, except of course the search coils 52 and perhaps preamplifiers which are located in the detector shoe assemblies.

An important feature of the invention is the recording of pig speed information on the tape 68 in the manner indicated in FIGURE 6. A toothed wheel 75 rotated by one of the wheels 60 for the centralizer mechanism produces pulses in a coil 76 by the action of a magnet 77, and the pulses produced are preamplified and applied by a conductor 78 and through the bunched conductors 66 to the recording head 67. As the tape will be driven at a constant speed, whereas the wheel 75 will turn at a variable speed depending upon the velocity of the pig through the pipeline, one channel of the recorded information will comprise a sine wave as produced by the coil 76 with the frequency of the sine wave being speed dependent.

Figure 7:
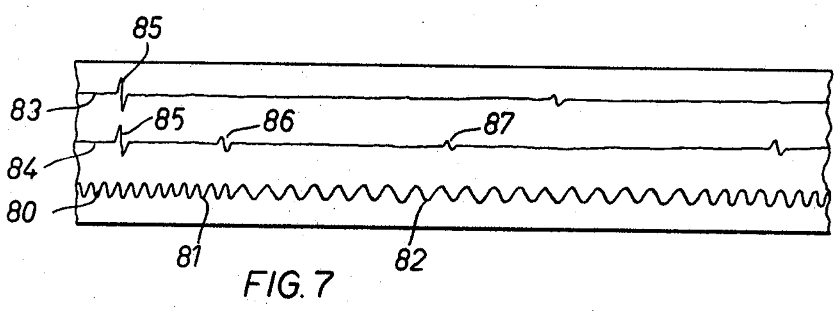
FIGURE 7 is a graphic representation of signals recorded in the apparatus of FIGURE 6.

If the tape recording produced by the apparatus of FIGURE 6 were transferred to a strip chart recording for visual inspection with the playback tape speed being constant and exactly the same as the recording tape speed, a visual record as seen in FIGURE 7 may result. Here the channel produced by the output of the coil 76 would appear as a trace 80 which contains portions 81 representing a relatively high pig speed along with a segment 82 of low frequency representing low pig speed. A pair of flaw detector traces 83 and 84 are also shown, these being the outputs of search coils 52, it being understood that there would be twelve or more of such traces even though only two are shown. The flaw detector traces 83 and 84 would usually contain large pulses 85 occurring when the pig passes a weld seam, along with a number of indications such as the pulses 86 and 87 which may represent flaws. The flaw pulse 86 occurs during the high speed portion 81 while the flaw pulse 87 occurs during the low speed portion 82; thus the actual relative sizes of the flaws are not truly represented by the relative sizes of the pulses 86 and 87 due to the fact that the sizes of the pulses generated in the coils 52 are dependent upon rate of change of flux, this being dependent upon pig speed as well as size and shape of the detected flaw. Accordingly, for a given sized flaw, the indications on the traces produced on the strip chart will always be smaller for slow pig speeds than for high speeds. Heretofore, the recording speed has been constant, as well as the playback speed for the tape, and a speed marker has been added as might be produced by a coil sensing a magnetic insert in one of the wheels 60 so that a pulse will be periodically recorded on a separate channel, the distance between pulses being related to speed. Thus in the prior art the person interpreting the strip chart record log would be required to estimate speed from the speed markers, then guessing the effect of speed on the flaw indications arrive at an estimate of flaw size. This type of interpretation of the log is recognized to be unreliable in the area of determining the size of the flaw, and since the decision of whether or not ot replace a section of pipeline must be based on this type of information, a serious deficiency in pipeline logging has therefore resulted.

Referring now to FIGURE 8, apparatus is shown for producing a visual record from the magnetic tape 68 which was recorded in the inspection run by the pigging apparatus. This playback arrangement varies the tape speed inversely with the speed of the pig during the recording operation. Here the tape 68 is driven from a supply reel 87 to a take up reel 88 by means including a capstan 89. The capstan is driven by a motor 90 which is of the variable speed type. A multiple channel pickup head 91 of conventional form reproduces the recorded signals which are applied by amplifiers 92 to a bank of light beam galvanometer movements 93, one for each channel, which produce traces on a moving strip chart 94 which is driven at a constant speed. Usually the strip chart would be composed of a photoresponsive material so that the light beams from the devices 93 result in visual traces on the strip chart. Of course inking pens could be used for this purpose. The pickup heads in the multiple channel device 91 are responsive to tape speed in the same manner as the search coils 52 in the pig. Precisely, the signals from the playback magnetic head 91 exhibit the same 6 db/octave signal versus characteristic that the search coils 52 produce. Accordingly, the recorded channel produced from the coil 76 and the wheel 75 (corresponding to the trace 80 of FIGURE 7) is reproduced as one channel of the output of the playback head 91 and this channel is applied by a line 97 and an amplifier 98 and motor drive circuitry 99 to an input 100 to the capstan motor 90. The speed of the capstan motor is varied according to the electrical energization signal applied to the input 100. The motor 90 function to produce a DC output current inversely proportional to the magnitude of current applied to the input 100, in which case the drive circuitry 99 would function to produce a DC output current inversely proportional to the frequency of the AC input received from the line 97 through the amplifier 98. AC synchronous motors could also be used, as well as a number of different techniques for varying the capstan rotational speed in relation to the playback of the pig speed reference signal. The effect is to normalize the outputs of the flaw detector channels upon playback so that the traces appearing on the visual strip chart 94 will appear as if the pig was traveling at a constant speed regardless of the actual speed variations of the pig. When the actual speed was low in the inspection run, the tape speed upon playback in the apparatus of FIGURE 8 would be high and so flaw signals even though recorded at low amplitude would produce high amplitude pulses because the playback tape speed would be high.

Figure 9:
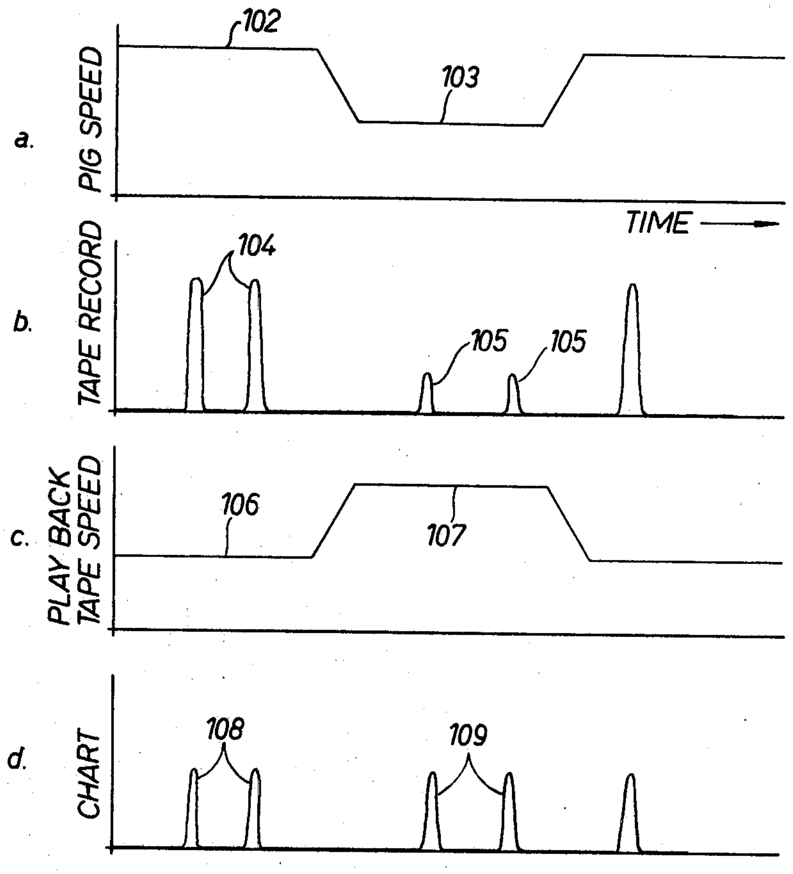

With reference to FIGURE 9, the normalization of the log produced by the apparatus of the invention may thus be appreciated. In FIGURE 9*a* the speed of the inspection pig is plotted as a function of time during an interval wherein the pig may encounter a section of pipeline of reduced inside diameter and thus slow up drastically due to friction. In any event, the speed of the pig is at a high level for a period 102 then drops to about half this level for a period 103, after which it resumes the original level. In FIGURE 9*b* the amplitudes of pulses produced by flaws occurring during this period are represented. The flaws may be exactly the same size and shape, but flaw pulses 104 occurring while the pig speed is high will be many times larger than flaw pulses 105 occurring while pig speed is low. However, as noted in FIGURE 9*c*, the playback tape speed as controlled by the capstan motor is inversely proportional to the pig speed as represented by FIGURE 9*a*, so the tape speed will be low for a period 106 corresponding to the high speed period 102, then the tape speed will be high for a period 107 corresponding to the low speed period 103. Therefore, the electrical output produced by the playback head, and thus the traces on the strip chart, will exhibit a constant output signal amplitude as represented by the pulses 108 and 109 of FIGURE 9*d*. In this manner, the flaw indications are normalized with respect to pig speed.

The structure used to derive a signal related to the speed of the inspection pig is illustrated in FIGURE 10. One of the wheels 60 used for the centralizer assembly of the trailing section 12 of FIGURE 1 may contain the toothed wheel 75 on its axle. The core 77 and coil 76 may be secured to the fork-shaped mounting bracket which connects the arm 61 to the axle of the wheel 60. The teeth of the wheel 75 will thus rotate close to the pole tip of the magnet 77, generating a signal in the coil 76. Alternatively the toothed wheel may be magnetized so that the speed signal would be derived from the pickup coil without the use of a permanent magnet 77. In any event, the flux in the coil 76 will vary in generally a sinusoidal fashion if the toothed wheel 75 is composed of ferromagnetic material.

What is claimed is:

1. In a recording playback system for producing playback signals that have magnitudes substantially independent of a variation in magnitude resulting from a change in the speed of relative motion between an elongated object conducting magnetic flux and flux leakage detecting means, wherein the detecting means detects leakage flux from the elongated object caused by a defect therein and produces electrical defect signals which relate to the defects and have a magnitude which is a function of the speed of the relative motion between the elongated object and the detecting means, and wherein said electrical defect signals are transduced and recorded on a recording medium together with a speed dependent signal having a characteristic corresponding to said speed of relative motion, the signals being recorded on the recording medium substantially without change of said speed characteristic of the speed dependent signal, said playback system comprising signal reproducing means responsive to signals recorded on said recording medium for producing related output electrical signals whose magnitudes are a function of the speed of relative motion between the recording medium and the reproducing means;

means for producing relative motion between said recording medium and the signal reproducing means, whereby the reproducing means produces related electrical defect signals and related speed dependent electrical signals, variable speed motor means included in the means for producing relative motion between the recording medium and the reproducing means, means responsive to said related speed dependent electrical signals from the reproducing means for controlling the relative speed of motion between the recording medium and the reproducing means as an inverse function of a speed characteristic of the speed dependent electrical signals, whereby the relative speed of motion between the recording medium and the reproducing means is an inverse function of the speed of relative motion between the elongated object and the detecting means and the magnitude of the related electrical defect signals from the reproducing means is substantially independent of the relative speed of the elongated object and detecting means.

2. In a magnetic recording playback system for producing playback signals that have magnitudes substantially independent of a variation in magnitude resulting from a change in the speed of relative motion between an elongated object conducting magnetic flux and flux leakage detecting means, wherein the detecting means detects leakage flux from the elongated object caused by a defect therein and produces electrical defect signals which relate to the defects and have a magnitude which is a function of the speed of the relative motion between the elongated object and the detecting means, and wherein said electrical defect signals are transduced and recorded on magnetic tape together with a speed dependent signal having a characteristic corresponding to said speed of relative motion, said magnetic tape moving past a recording head at a speed unrelated to said speed of relative motion between the elongated object and the detecting means, said playback system comprising a magnetic tape pickup head, tape drive means for moving a magnetic tape past said pickup head, said tape having recorded thereon said defect signals and said speed dependent signals, said pickup head being responsive to the recorded speed dependent signals to produce related speed dependent electrical signals and being responsive to the recorded defect signals to produce related output electrical defect signals, said pickup head producing output electrical signals whose magnitudes are a function of the speed of the magnetic tape moving past it, a variable speed motor included in said tape drive means, means responsive to said speed dependent electrical signal from the pickup head for controlling the speed of rotation of the variable speed motor as an inverse function of a speed characteristic of the speed dependent electrical signal, whereby the speed of the magnetic tape moving past the pickup head is an inverse function of the speed of relative motion between the elongated object and detecting means, and the magnitude of the related electrical defect signals produced by the pickup head are substantially independent of the relative speed of the elongated object and detecting means.

3. The combination claimed in claim 2 wherein said magnetic tape moves past the recording head at a substantially constant speed.

4. The combination claimed in claim 3 and further including means connected to the output of the pickup head for providing a visual display corresponding to electrical defect signals from the pickup head.

5. The combination claimed in claim 4 wherein the visual display is on a strip chart record.

6. The combination claimed in claim 5 wherein said strip chart moves at a relatively constant speed as the visual display is recorded thereon.

7. The system claimed in claim 6 wherein said elongated object is a pipeline and said detecting means are flux leakage detector coils carried by inspection apparatus that passes through the pipeline.

8. A method of producing playback signals from recorded signals, wherein the playback signals have magnitudes substantially independent of a variation in magnitude resulting from a change in the speed of relative motion between an elongated object conducting magnetic flux and flux leakage detecting means, wherein the detecting means detects flux leakage from the elongated object caused by a defect therein and produces electrical defect signals which relate to the defects and have a magnitude which is a function of the speed of the relative motion between the elongated object and the detecting means, wherein said electrical defect signals are transduced and recorded on a recording medium together with a speed dependent signal having a characteristic corresponding to said speed of relative motion, the signals being recored on a recording medium substantially without change of said speed characteristic of the speed dependent signal, said method comprising the steps of moving said recording medium past a signal reproducing means at a controllable speed, reproducing signals recorded on said medium to produce related electrical defect signals and related speed dependent signals, the output signals of the reproducing means being a function of the speed of relative motion between said recording medium and the reproducing means, controlling the relative speed of motion between the recording medium and the reproducing means as an inverse function of the speed characteristic of the related speed dependent signal, whereby the magnitude of the related electrical defect signals from the reproducing means is substantially independent of the relative speed of motion between the elongated object and the detecting means.

9. The method claimed in claim 8 and including the further steps of producing a visual record of the related electrical defect signals produced by the reproducing means.

10. The method claimed in claim 9 wherein said visual record is a strip chart which is moved at a substantially constant speed as the record is made thereon.

References Cited

UNITED STATES PATENTS

| | | |
|---|---|---|
| 2,496,103 | 1/1950 | Neufeld. |
| 2,940,302 | 6/1960 | Scherbatskoy. |

ALFRED E. SMITH, Primary Examiner

U.S. Cl. X.R.

346—33